(12) United States Patent
Zagorski et al.

(10) Patent No.: US 11,292,146 B2
(45) Date of Patent: Apr. 5, 2022

(54) CUTTING APPARATUS FOR MINIMIZING DEFLECTION OF A DIE CUTTER ASSEMBLY

(71) Applicant: International Cutting Die, Inc., Melrose Park, IL (US)

(72) Inventors: Mariusz Zagorski, Itasca, IL (US); Zbigniew Zielinski, Prospect Heights, IL (US)

(73) Assignee: INTERNATIONAL CUTTING DIE, INC., Melrose Park, IL (US)

( * ) Notice: Subject to any disclaimer, the term of this patent is extended or adjusted under 35 U.S.C. 154(b) by 0 days.

(21) Appl. No.: 15/659,141

(22) Filed: Jul. 25, 2017

(65) Prior Publication Data

US 2018/0021971 A1    Jan. 25, 2018

Related U.S. Application Data

(60) Provisional application No. 62/366,210, filed on Jul. 25, 2016.

(51) Int. Cl.
*B23D 25/02*  (2006.01)
*B26D 7/26*  (2006.01)
(Continued)

(52) U.S. Cl.
CPC .............. *B26D 7/265* (2013.01); *B23D 25/02* (2013.01); *B26D 7/204* (2013.01); *B26F 1/384* (2013.01); *Y10T 83/4838* (2015.04)

(58) Field of Classification Search
CPC ........ B23D 25/12; B23D 25/02; B23D 25/04; B26D 7/265; B26D 7/204; B26D 7/2628;
(Continued)

(56) References Cited

U.S. PATENT DOCUMENTS 2,157,054 A  *  5/1939  Gammeter .......... B29C 65/7441
                                                493/194
3,276,306 A  *  10/1966  Winkler et al. ........ B26D 1/245
                                                83/311
(Continued)

FOREIGN PATENT DOCUMENTS

EP          1 226 908       *  7/2002 ............. B26D 7/265

*Primary Examiner* — Clark F Dexter
(74) *Attorney, Agent, or Firm* — Donald J. Ersler

(57) ABSTRACT

A cutting apparatus for cutting a web within a frame includes a die cutter assembly including a cutting blade projecting from a cylindrical surface and a counter anvil including first and second ends journaled into the frame. The counter anvil is positioned below the die cutter assembly for receiving the web fed therebetween across a width of the frame. The cutting apparatus includes first and second outboard bearing assemblies positioned on the die cutter near the first and second opposing ends, respectively, and one or more inboard bearing assemblies positioned about the die cutter assembly and spaced inwardly from the outboard bearing assemblies. Each outboard bearing assembly is configured to control a spacing between the die cutter assembly and the counter anvil along the width of the frame. The cutting apparatus also includes one or more actuators positioned atop the frame in connection with the one or more inboard bearing.

6 Claims, 5 Drawing Sheets

(51) Int. Cl.
*B26F 1/38* (2006.01)
*B26D 7/20* (2006.01)

(58) Field of Classification Search
CPC ..... B26D 7/2635; B26D 7/2642; B26F 1/384; B21B 31/20; B21B 31/22; B21B 31/32; F16C 13/02; F16C 13/024; F16C 13/026; F16C 13/028; Y10T 83/483; Y10T 83/4833; Y10T 83/4838; Y10T 83/4844
USPC .................................. 83/343, 344, 346, 348
See application file for complete search history.

(56) References Cited

U.S. PATENT DOCUMENTS

| | | | | |
|---|---|---|---|---|
| 3,448,684 A * | 6/1969 | Cardinet et al. | ........ | F16C 25/04 100/171 |
| 3,877,336 A * | 4/1975 | Hillesheimer | ........ | B26D 7/265 83/512 |
| 4,095,498 A * | 6/1978 | Biggar, III | .......... | B26D 7/2614 83/346 |
| 4,226,150 A * | 10/1980 | Reed | .................... | B26D 7/2628 83/344 |
| 4,413,541 A * | 11/1983 | Biggar, III | .......... | B23D 35/008 101/153 |
| 4,517,873 A * | 5/1985 | Wilson | ................... | B26D 3/085 83/341 |
| 4,553,461 A * | 11/1985 | Belongia | ................. | B26D 7/00 83/342 |
| 4,759,247 A * | 7/1988 | Bell et al. | ............ | B26D 7/2628 83/344 |
| 5,083,488 A * | 1/1992 | Stanley et al. | ........ | B26D 7/2628 100/168 |
| 5,156,076 A * | 10/1992 | Rosemann | ........... | B26D 7/2628 100/168 |
| 5,174,185 A | 12/1992 | Aichele | | |
| 5,388,490 A * | 2/1995 | Buck | .................... | B26D 7/2628 83/344 |
| 5,467,678 A * | 11/1995 | Stollenwerk | ......... | B26D 7/2628 100/170 |
| 5,704,284 A * | 1/1998 | Stollenwerk | ......... | B26D 7/2628 100/168 |
| 5,915,644 A * | 6/1999 | Prittie | ....................... | B31F 1/07 226/177 |
| 6,658,973 B1 * | 12/2003 | Sahm | ................. | B65G 21/2036 226/170 |
| 6,776,075 B1 * | 8/2004 | Grate et al. | ............ | B23D 25/12 83/304 |
| 7,299,729 B2 | 11/2007 | Cox | | |
| 7,849,772 B2 | 12/2010 | Monteil | | |
| 7,942,088 B2 | 5/2011 | Grenier et al. | | |
| 8,863,627 B2 | 10/2014 | Kandemir | | |
| 9,003,939 B2 | 4/2015 | Dijon et al. | | |
| 9,079,322 B2 * | 7/2015 | Demand | ................ | B26D 7/265 |
| 9,327,417 B2 | 5/2016 | Saga | | |
| 9,346,182 B2 * | 5/2016 | Horii et al. | ............. | B26F 1/384 |
| 2007/0101844 A1 * | 5/2007 | Spilker | ................ | B26D 7/2628 83/344 |
| 2012/0255412 A1 * | 10/2012 | Dijon et al. | .......... | B26D 1/405 83/344 |
| 2013/0283987 A1 | 10/2013 | Pras et al. | | |

\* cited by examiner

CUTTING APPARATUS FOR MINIMIZING DEFLECTION OF A DIE CUTTER ASSEMBLY

CROSS-REFERENCE TO RELATED APPLICATION

This application claims the benefit of priority to U.S. Provisional Application No. 62/366,210 filed on Jul. 25, 2016, the disclosure of which is incorporated herein by reference.

BACKGROUND OF THE INVENTION

The present subject matter relates generally to rotary die cutting machinery. More specifically, the present invention relates to a die cutter assembly that includes one or more inboard bearing housing assemblies that apply pressure along the width of the die cutter through the use of air cylinders, pneumatic cylinders, hydraulic cylinders, or any other suitable means.

Die cutting machinery is used in many industries to efficiently and quickly cut a consistent image out of a roll of material such as rubber, cloth, paper, or other low-strength material. Referring to FIG. 1, a conventional rotary die cutting machine 50 includes a cylindrical cutting die 52 and a cylindrical counter anvil 54 rotating in opposite directions. A long sheet or web 56 of material is fed into the cutting nip 58 formed by the cutting die 52 and the counter anvil 54, and a cutting blade or other tool in the shape of the image formed on the cutting die 52 cuts the web 56 moving through the machine 50. The cutting speed may range between about 200 and about 450 meters per minute, depending on the materials, the cutting tool, and other components.

During use, cutting forces at the cutting area cause the cutting die to separate from the counter anvil, creating deflection. On a wide web of material, pressure is applied near the outer ends of the cutting die, remote from the cutting area and therefore contributing to the deflection. As the speed increases, the rate at which the cutting forces create the deflection increases as well.

Deflection often results in weak or no cuts being made at the cutting area as well as an unstable cutting die that bounces on the counter anvil, leading to premature failure. This deflection also causes increased heat and thermal expansion in the outer bearing housings, further contributing to premature failure.

In some designs, the rotary die cutting machine includes cam follower bearings on the bearing surfaces of the die cutter. However, the bearings are too small for the application, fail prematurely, and are spaced too remotely from the blade to effectively, which causes the die cutter to deflect away from the counter anvil during use. Other designs include bearing rings on the counter anvil that are ground to the same height as the cutting blade, but these bearing rings often have a low heat resistance and fail prematurely. Another strategy to counteract deflection includes bending the counter anvil, but this approach fails to address the thermal expansion of the outer bearings and can damage the cutting blade if the bend is imprecise.

Accordingly, there is a need for rotary die cutting machinery that minimizes or eliminates deflection of the cutting die away from the counter anvil.

BRIEF SUMMARY OF THE INVENTION

To meet the needs described above and others, the present disclosure provides a die cutter assembly for maintaining constant pressure across the width of a cutting die. The die cutter assembly of the present application includes a cutting blade or other cutting tool positioned along a surface of the cutting die at a cutting area. First and second inboard bearing housing assemblies that engage with air cylinders are located at midpoints along the width of the cutting die, spaced from the first and second ends and adjacent to the cutting area. The inboard bearing housing assemblies apply pressure at midpoints along the width to maintain a stable, non-deflecting cutting die relative to an adjacent counter anvil through air cylinders, pneumatic cylinders, hydraulic cylinders, or any other suitable means.

Minimizing deflection of the cutting die allows for increasing machines speeds and better control over the materials. In some embodiments, use of inboard air pressure cylinders of the present invention increases the machine speed by as much as 50% to 100%. A stable die cutter also allows for cutting of thinner, lower strength materials such as 10 GSM (grams per square meter) non-woven materials. Increasing the stability of the cutting die also extends the life of the cutting die by reducing the heat and thermal expansion in the outboard bearings, which in turn reduces the interference of the cutting blade into the counter anvil.

In the die cutter assembly of the present application, spacing between the die cutter and the counter anvil is dimensioned to the height of the cutting blade. First and second outboard bearings positioned adjacent to first and second ends, respectively, of the die cutter control the height of the spacing.

The first and second inboard air cylinders apply pressure to the cutting die at first and second inboard bearings, respectively. In some embodiments, the cutting area is located centrally along the width of the cutting die, and the first and second inboard bearings are immediately adjacent to the cutting area and spaced from first and second ends of the cutting die. In other embodiments, portions of the cutting area are between the first and second inboard bearings while other portions of the cutting area are closer to the first and second ends of the cutting die.

Over time, the quality of the cut deteriorates as a result of the deflection of the cutting die. To counter the deflection of the cutting die, first and second air pistons of the first and second inboard air cylinders, respectively, apply pressure to the first and second bearings, respectively. The air pistons may be pneumatic cylinders, hydraulic cylinders, or any device that provides a mechanical loading to the first and second bearings. Pressure applied to the first and second inboard bearings may range between about 500 psi to about 5000 psi.

An object of the invention is to provide a die cutting assembly that eliminates deflection while minimizing heat and thermal expansion in the outboard bearings.

An advantage of the invention is that the assembly results in extended die performance and higher cutting speeds.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations described herein.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
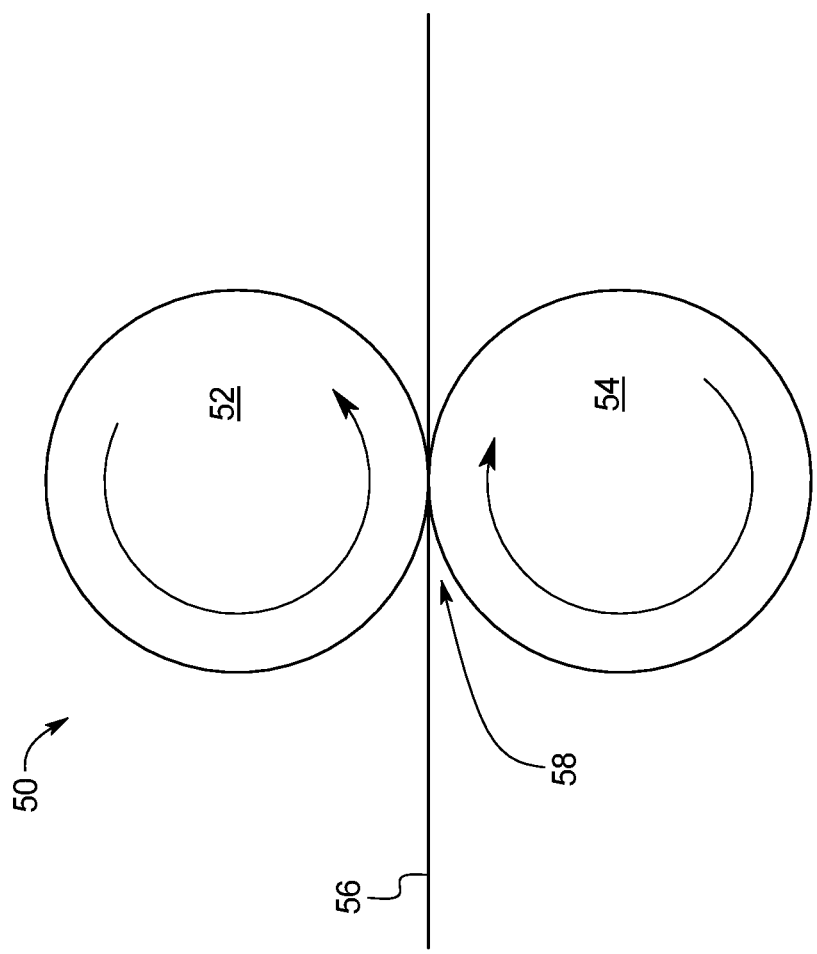
FIG. 1 is a schematic of a conventional rotary die cutting machine.
Figure 2:
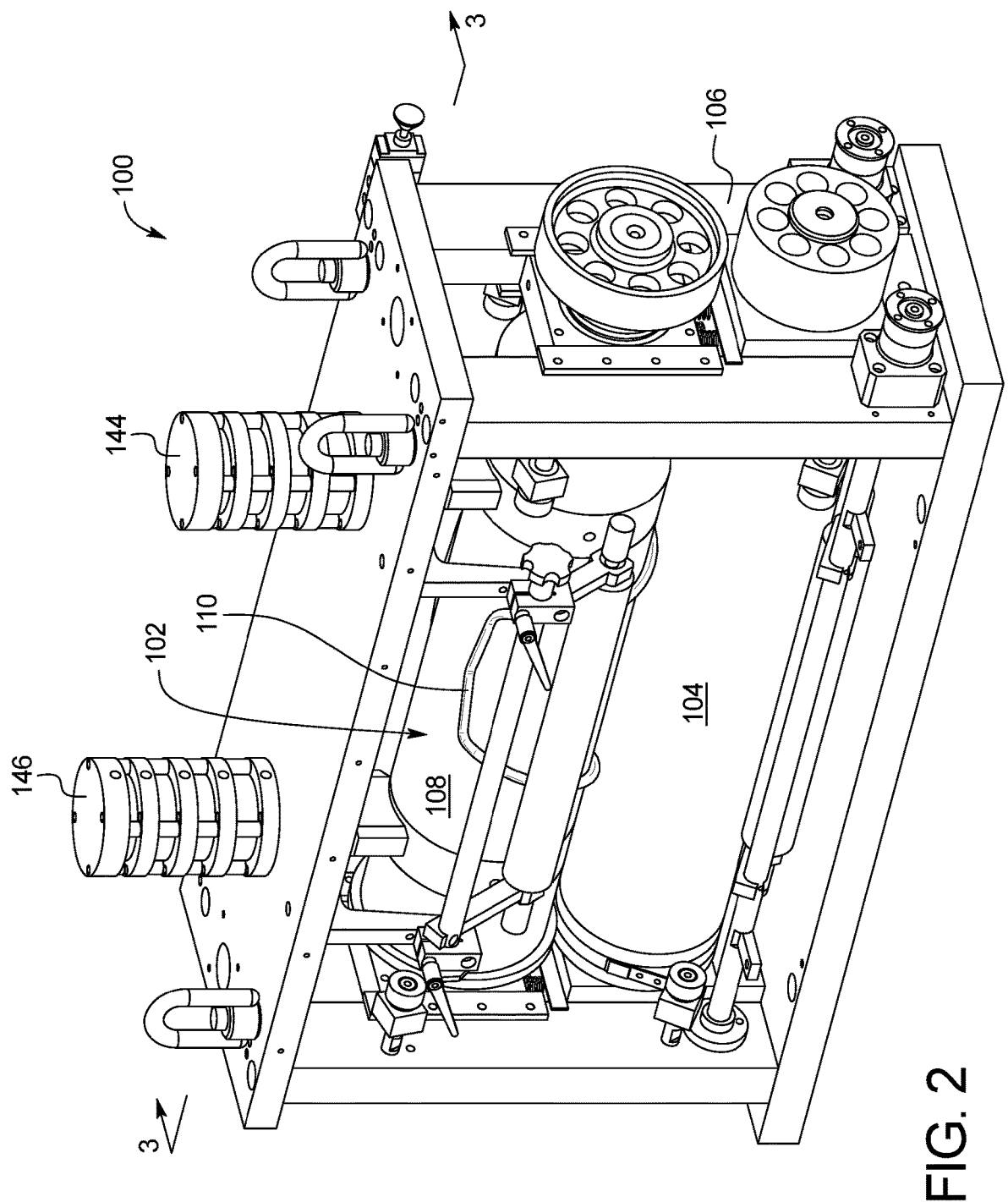
FIG. 2 is a perspective view of a rotary die cutter machine of the present application.
Figure 3:
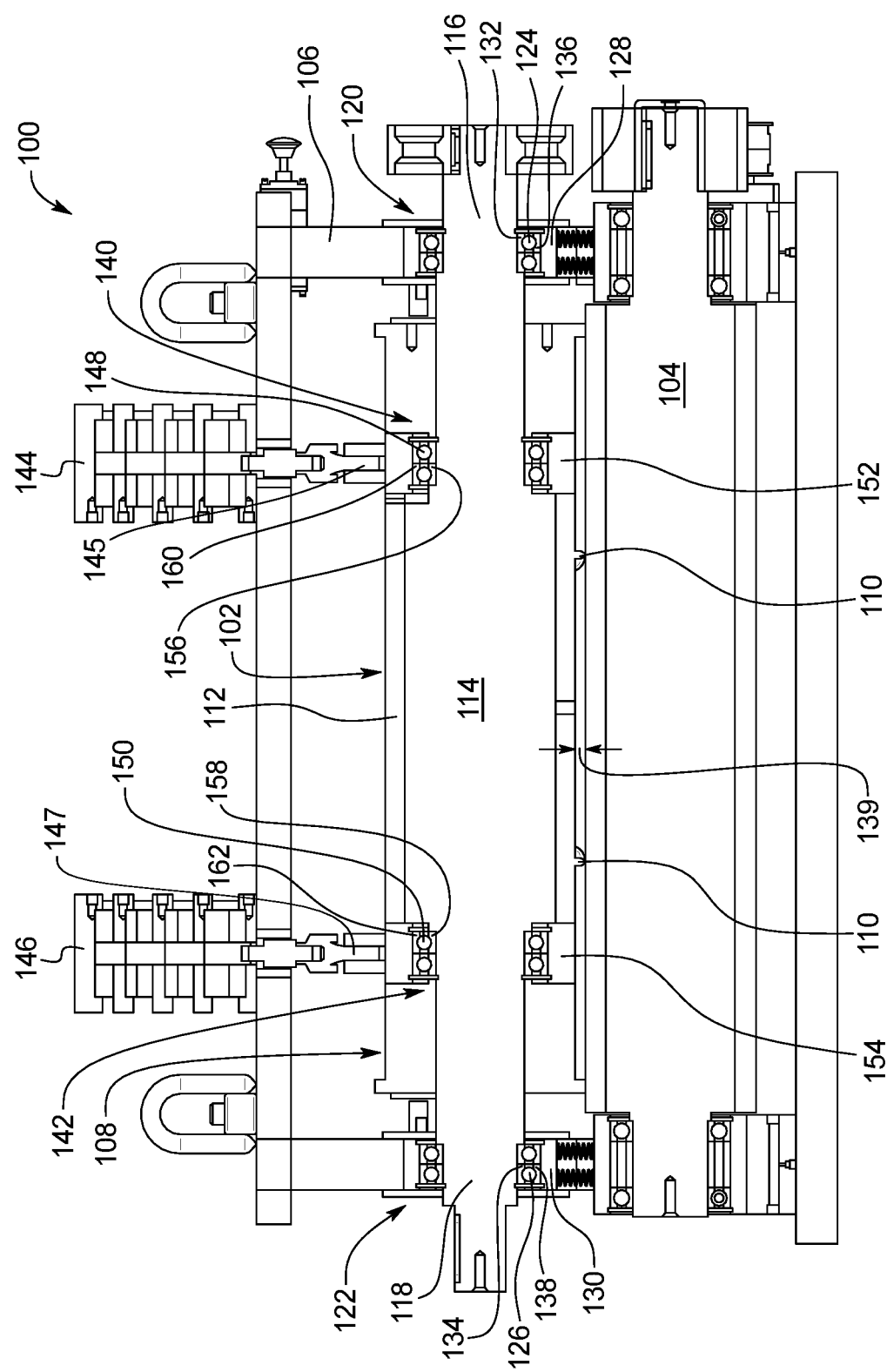
FIG. 3 is cross sectional view of the die cutter machine generally taken along lines 3-3 of FIG. 2.

Referring to FIGS. 2 and 3, the rotary die cutting machine 100 of the present application includes a die cutter assembly 102 and a counter anvil 104 mounted within a frame 106. A die cutter 108 of the die cutter assembly 102 includes a cutting blade 110 located centrally along the width of the die cutter 108, although the positioning of the cutting blade 110 may extend further along the width as necessary or desired.

Figure 5:
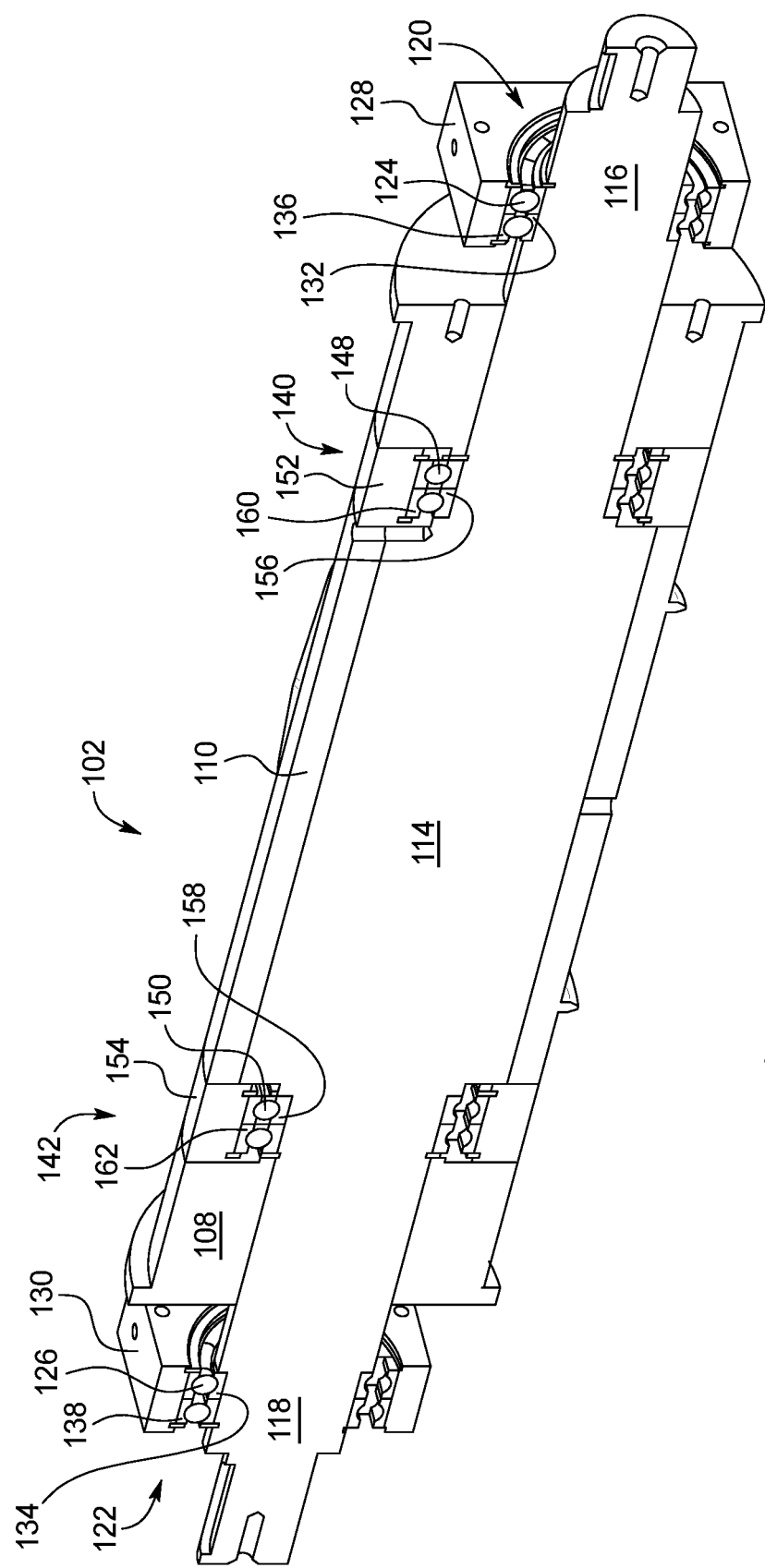
FIG. 5 is cross sectional view of the die cutter assembly generally taken along lines 5-5 of FIG. 4.

As shown in FIGS. 3 and 5, the die cutter 108 includes a die sleeve 112 mounted or otherwise secured to a die shaft 114. First and second ends 116, 118 of the die shaft 114 are journaled into the frame 106 as shown in FIGS. 2 and 3. The die shaft 114 is connected to a motor (not shown) that causes rotation of the die cutter assembly 102.

Referring to FIGS. 3 and 5, first and second outboard bearing assemblies 120, 122 of the die cutter assembly 102 including first and second outboard bearings 124, 126, respectively, that rotate within first and second outboard bearing housings 128, 130, respectively. The Inner races 132, 134 of the outboard bearings 124, 126 are mounted to the die shaft 114, and outer races 136, 138 of the outboard bearings 124, 126 are mounted to the outboard bearing housings 128, 130.

The elevation of the die cutter assembly 102 is controlled by adjusting the elevation of the outboard bearing housings 128, 130. Best seen in FIG. 3, the outboard bearing assemblies 120, 122 control the vertical spacing 139 of the die cutter assembly 102 and the counter anvil 104, and are adjusted based on the blade height and the amount of deflection to be countered.

Figure 4:
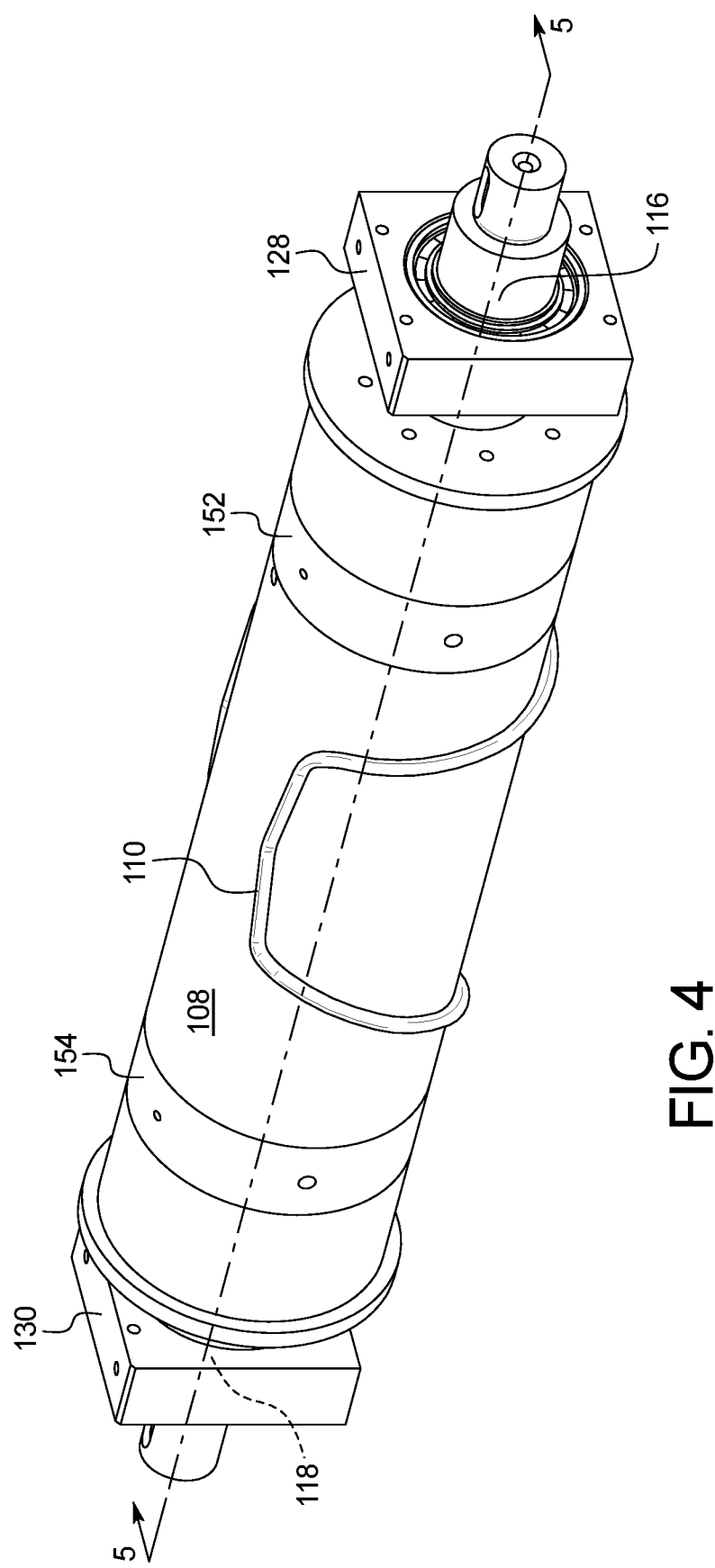
FIG. 4 is a perspective view of a die cutter assembly of the present application.

Referring to FIGS. 3-5, first and second inboard bearing assemblies 140, 142 positioned along the width of the die cutter 108 are spaced inwardly from the first and second ends 114, 116, respectively, of the die cutter 108. First and second actuators 144, 146 positioned atop the frame 106 apply pressure to the die cutter 108 through the first and second inboard bearing assemblies 140, 142. First and second inner bearings 148, 150, respectively, rotate within first and second inboard bearing housings 152, 154, respectively, of the first and second inboard bearing assemblies 140, 142. The inner races 156, 158 of the inboard bearings 148, 150 are mounted to the die shaft 114, and the outer races 160, 162 of the inboard bearings 148, 150 are mounted to the inboard bearing housings 152, 154.

As shown in FIGS. 2 and 3, the first and second actuators 144, 146 include first and second piston rods 145, 147, respectively, that contact the first and second inboard bearing housings 152, 154, respectively. Activation of each actuator 144, 146 applies downward pressure through the first and second piston rods 145, 147 to the inboard bearing housings 152, 154. In some embodiments, the first and second inboard bearing assemblies 140, 142 are positioned immediately adjacent to the cutting blade 110. While the outboard bearing assemblies 120, 122 control the spacing 139 between the die cutter assembly 102 and the counter anvil 104, the profile of deflection may vary along the width of the frame 102, particularly at the cutting blade 110. Use of the actuators 144, 146 through the inboard bearing assemblies 140, 142 directs the pressure to the area experiencing the most deflection—the cutting blade 110. The actuators 144, 146 may be any suitable mechanical device for applying pressure to the first and second inboard bearing assemblies, such as air cylinders, hydraulic cylinders, and/or pneumatic cylinders.

The pressure applied through each of the first and second actuators 144, 146 may be equal or different, depending on the profile of deflection, the cutting forces along the width of the die cutter assembly 102, and other such variables. Further, the die cutter assembly 102 may include any number of inboard air cylinder(s) 144, 146 as required by the application, the shape of the cutting blade, the strength of the material to be cut, and other variables.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A cutting apparatus including a die cutter assembly for cutting a web, said cutting apparatus comprising:
   a frame including a top frame surface, a bottom frame surface, a first side frame surface and a second side frame surface;
   first and second inboard bearing assemblies;
   said die cutter assembly, wherein said die cutter assembly includes a die shaft having a sleeve diameter, a first end and a second end, said first end extends from a first end of said sleeve diameter, said second end extends from a second end of said sleeve diameter, said first end of said die shaft is in contact with and rotatably retained by an inner race of a first bearing of said first inboard bearing assembly, said second end of said die shaft is in contact with and rotatably retained by an inner race of a second bearing of said second inboard bearing assembly;
   said die cutter assembly further including a die cutter on said sleeve diameter, and said die cutter including a cutting blade;
   a first actuator and a second actuator retained on said top frame surface, a moving end of said first actuator is engaged with said first inboard bearing assembly, a moving end of said second actuator is engaged with said second inboard bearing assembly;
   a first outboard bearing assembly mounted to said first side frame surface, said first outboard bearing assembly rotatably retains said first end of said die shaft relative to said first side frame surface;
   a second outboard bearing assembly mounted to said second side frame surface, said second outboard bearing assembly rotatably retains said second end of said die shaft relative to said second side frame surface; and
   a counter anvil having opposing ends rotatably retained in first and second side frame surfaces, wherein outer surfaces of said first and second inboard bearing assemblies do not contact said counter anvil, and wherein a web is locatable between said die cutter and said counter anvil to cut a plurality of parts from the web.

2. The cutting apparatus of claim 1, wherein said die cutter includes a die sleeve retained on said sleeve diameter, and said cutting blade is formed on an outside surface of said die sleeve.

3. A cutting apparatus including a die cutter assembly for cutting a web, said cutting apparatus comprising:
- a frame including a top frame surface, a bottom frame surface, a first side frame surface and a second side frame surface;
- first and second inboard bearing assemblies;
- said die cutter assembly, wherein said die cutter assembly includes a die shaft having a sleeve diameter, a first end and a second end, said first end extends from a first end of said sleeve diameter, said second end extends from a second end of said sleeve diameter, said first end of said die shaft is in contact with and rotatably retained by an inner race of a first bearing of said first inboard bearing assembly, said second end of said die shaft is in contact with and rotatably retained by an inner race of a second bearing of said second inboard bearing assembly, a diameter of said first and second ends of said die shaft is less than said sleeve diameter of said die shaft;
- said die cutter assembly further including a die cutter on said sleeve diameter, and said die cutter including a cutting blade;
- a first actuator and a second actuator retained on said top frame surface, a moving end of said first actuator is engaged with said first inboard bearing assembly, a moving end of said second actuator is engaged with said second inboard bearing assembly;
- a first outboard bearing assembly mounted to said first side frame surface, said first outboard bearing assembly rotatably retains said first end of said die shaft relative to said first side frame surface;
- a second outboard bearing assembly mounted to said second side frame surface, said second outboard bearing assembly rotatably retains said second end of said die shaft relative to said second side frame surface; and
- a counter anvil having opposing ends rotatably retained in first and second side frame surfaces, wherein outer surfaces of said first and second inboard bearing assemblies do not contact said counter anvil, and wherein a web is locatable between said die cutter and said counter anvil to cut a plurality of parts from the web.

4. The cutting apparatus of claim 3, wherein said die cutter includes a die sleeve retained on said sleeve diameter, and said cutting blade is formed on an outside surface of said die sleeve.

5. A cutting apparatus including a die cutter assembly for cutting a web, said cutting apparatus comprising:
- a frame including a top frame surface, a bottom frame surface, a first side frame surface and a second side frame surface;
- first and second inboard bearing assemblies;
- said die cutter assembly, wherein said die cutter assembly includes a die shaft having a sleeve diameter, a first end and a second end, said first end extends from a first end of said sleeve diameter, said second end extends from a second end of said sleeve diameter, said first end of said die shaft is in contact with and rotatably retained by an inner race of a first bearing of said first inboard bearing assembly, said second end of said die shaft is in contact with and rotatably retained by an inner race of a second bearing of said second inboard bearing assembly, said first inboard bearing housing assembly is located adjacent said first end of said sleeve diameter, said second inboard bearing housing assembly is located adjacent said second end of said sleeve diameter;
- said die cutter assembly further including a die cutter on said sleeve diameter, and said die cutter including a cutting blade;
- a first actuator and a second actuator retained on said top frame surface, a moving end of said first actuator is engaged with said first inboard bearing assembly, a moving end of said second actuator is engaged with said second inboard bearing assembly;
- a first outboard bearing assembly mounted to said first side frame surface, said first outboard bearing assembly rotatably retains said first end of said die shaft relative to said first side frame surface;
- a second outboard bearing assembly mounted to said second side frame surface, said second outboard bearing assembly rotatably retains said second end of said die shaft relative to said second side frame surface; and
- a counter anvil having opposing ends rotatably retained in first and second side frame surfaces, wherein outer surfaces of said first and second inboard bearing assemblies do not contact said counter anvil, and wherein a web is locatable between said die cutter and said counter anvil to cut a plurality of parts from the web.

6. The cutting apparatus of claim 5, wherein said die cutter includes a die sleeve retained on said sleeve diameter, and said cutting blade is formed on an outside surface of said die sleeve.

* * * * *